Figure 1:
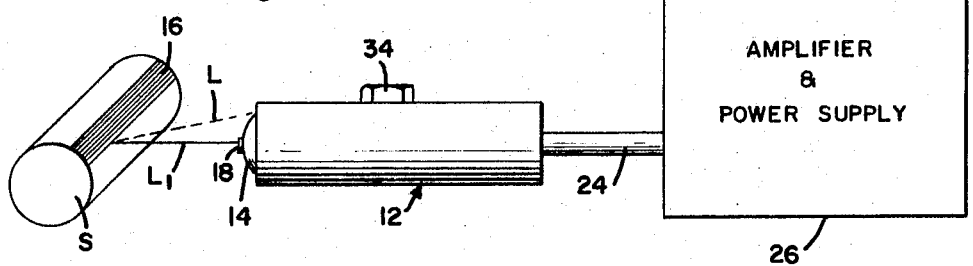

April 11, 1967 J. R. CLINTON 3,313,945
APPARATUS FOR SENSING VARIATIONS IN LIGHT
REFLECTIVITY OF A MOVING SURFACE
Filed Aug. 27, 1963

INVENTOR
James R. Clinton
BY
Townsend and Townsend
attorneys

United States Patent Office 3,313,945
Patented Apr. 11, 1967

3,313,945
APPARATUS FOR SENSING VARIATIONS IN LIGHT REFLECTIVITY OF A MOVING SURFACE
James R. Clinton, 854 Main St., El Segundo, Calif. 90245
Filed Aug. 27, 1963, Ser. No. 304,870
3 Claims. (Cl. 250—236)

This invention relates to apparatus for counting events which are manifested by a change in light reflectivity of a surface and has particular application to detecting the total number of revolutions of a rotating shaft without any physical contact with the shaft.

The embodiment of the invention to be described in detail hereinafter includes an annular shaped lens, a light source behind the lens for illuminating the lens, a light-sensitive photo cell disposed concentrically with the lens, and an opaque shield between the photo cell and the lens which shield is open to admit light reflected from a remote object to the photo cell. Conventional electronic circuitry is provided for amplifying the signals generated by the photo cell in response to light changes and for counting the individual pulses in the photo cell output. In a preferred form of the invention a strip of non-reflective tape is placed on the surface of a rotating shaft which surface is otherwise light reflective. The light from the lens illuminates the shaft and each time the non-reflective tape comes into view, the photo cell senses the lower light intensity due to the lower reflectivity of the tape and generates an electric signal corresponding to the change in light intensity.

An object of the invention is to provide a device for counting the number of rotations of a rotating shaft or the like which device requires no physical connection with the shaft. This object is realized by providing a light source, a photo cell and a strip of material for mounting on the shaft which material has a different degree of light reflectivity than the remainder of the shaft. The shaft is illuminated by the light source and as the strip of material having different light reflecting characteristics comes into the beam of the light source, the difference in reflection is sensed by the photo cell. The photo cell output is then amplified and counted in accordance with conventional techniques.

Another object of this invention is to provide a device of the type described which operates properly irrespective of the distance at which it is spaced from the moving shaft. This object is achieved by providing a annular lens and placing the light sensitive photo cell coaxially or concentrically with the lens. A shield between the photo cell and the lens prevents excitation of the photo cell from any source other than directly in front of the device. Thus the photo cell need only be directed at the moving shaft but its spacing from the shaft is not critical. The invention therefore eliminates errors due to parallax in prior art systems utilizing light sources and the photo cells remote from one another.

Still another object is to provide a device of the type described which is substantially self-contained and of a very small size. The small size permits the device to be held in the hand or to be mounted adjacent to shafts where there is only a very small clearance space. This object is attained by constructing the device in the form of a hollow tube in which a piece of translucent material such as Lucite is disposed. Remote from the forward end of the device a light source is placed which light is transmitted through the translucent material to the face thereof. The face is formed with a convex lens surface and has an opening therein to receive a tubular opaque shield, which shield extends forward of the lens surface. Within the shield is disposed a photocell which is excited only by light entering the outer end of the shield.

Figure 2:
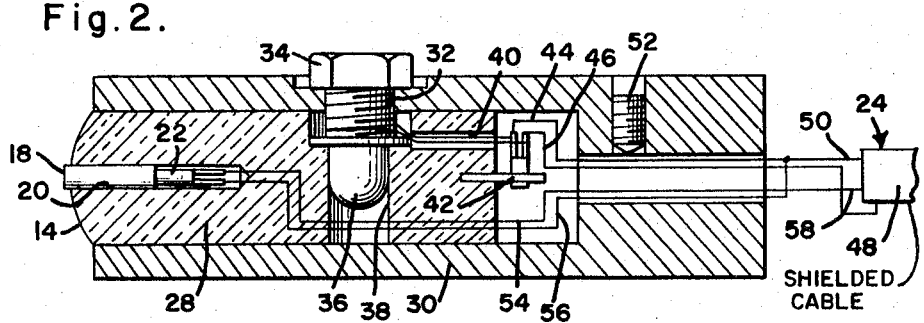
Figure 3:
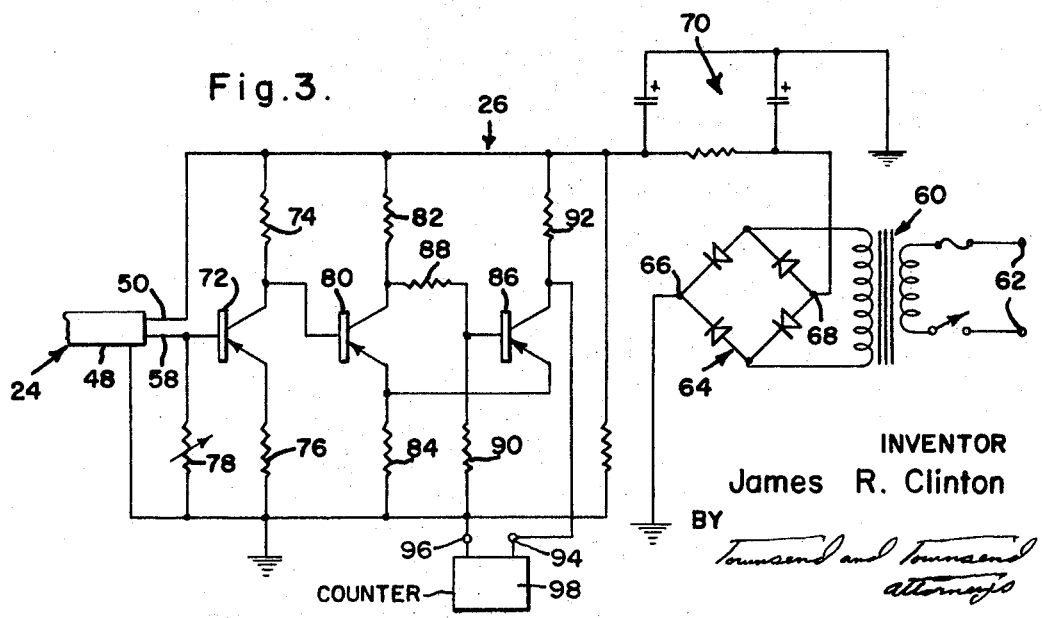

These and other objects will be more apparent after referring to the following specification and accompanying drawings in which:

FIGURE 1 is a diagrammatic view of the preferred embodiment of the invention;
FIGURE 2 is a cross-sectional view of the probe of the present invention in which is mounted a light source and a photo cell; and
FIGURE 3 is a schematic diagram of an electronic circuit for amplifying the photo cell output.

Referring more particularly to the drawings reference numeral 12 generally indicates a probe having a lens surface 14 which emits a light beam L to impinge on a rotating shaft S. The outer surface of shaft S is typically light reflective and might be polished steel, for example. Mounted on the shaft S is a strip of non-reflective material 16 such as black tape or the like. Light is reflected from the shaft along a path L' and enters an opening 18 in probe 12. Delimiting opening 18 is an opaque tubular shield 20 having disposed therein at a site remote from the opening 18 a photoelectric cell 22. The photo-electric cell is a conventional element of the type that develops an impedance change across its output terminals when excited by light rays; the magnitude of the impedance change is proportional to the intensity of the light. A cable 24 is provided for connecting probe 12 to an amplifier-power supply 26, which will be described in detail herein below. It will be understood that each time shaft S rotates, non-reflective strip 16 will interrupt the light beam L', and such an interruption will cause a variation in the output of photocell 22 which output is conveyed through a cable 24 to amplifier 26.

Lens surface 14 is preferably formed on a cylindric body 28 of translucent material such as Lucite or the like. The translucent body is housed in a casing 30 which may be aluminum or the like. Casing 30 is threadedly apertured at 32 for receiving a conventional lamp socket 34 for supporting a lamp 36 in the interior of casing 30. Translucent body 28 is bored at 38 to receive lamp 36 therein; the lamp therefore illuminates convex lens surface 14 through the translucent body and further illuminates any objects at which the probe is directed. Lucite body 28 is axially bored at 40 to communicate conductors from lamp 36 to a conventional terminal block 42 mounted on the rear of translucent block within casing 30. Lead wires 44 and 46 extend from terminal block 42 to cable 24. Cable 24 is formed with a conductive sheath 48 to which conductor 46 is connected and a central conductor 50 to which conductor 44 is connected. As will be described hereinafter, lamp 36 is powered through cable 24. A set screw 52 is provided in casing 30 to secure cable 24 to probe 12.

Translucent body 28 is also bored to accommodate conductors 54 and 56 which communicate the output of photocell 22 to cable 24. Conductor 56 is connected to conductor 50 in cable 24 and conductor 54 is connected to a second central conductor 58 within the cable.

Amplifier-power source 26 includes a step-down power transformer 60 on the input winding of which A.C. power is connected via terminals 62. The secondary winding of the transformer 60 is connected to a conventional bridge rectifier circuit 64. In the embodiment shown, the positive output terminal 66 of the rectifier bridge is grounded but as will become obvious such is necessitated only by the specific elements selected in the amplifier circuit proper. Negative output terminal 68 of rectifier bridge 64 is connected through a conventional filter circuit 70 to central conductor 50 in cable 24 to provide power for lamp 36 and bias current to photocell 22. Conductive shield 48 of cable 24 is grounded at the amplifier to complete the circuit to the lamp. Through conductor 58 in cable 24, the output of photocell 22 is connected to an input transistor amplifier stage 72 which is powered through conventional bias circuitry including resistors 74 and 76. Across the input of transistor 72 is connected a potentiometer 78 for adjusting the sensitivity of the device. It will be seen that photocell 22 and potentiometer 78 form a voltage divider circuit at the input of transistor 72. The output of input amplifier circuit 72 is connected to a Schmitt trigger circuit formed by transistors 80 and 86, and biasing resistors 82, 84, 88, 90 and 92. The collector electrode of transistor 86 constitutes one output terminal 94 of the Schmitt trigger; ground constitutes the other output terminal 96. Amplifier output terminals 94 and 96 are connected to any conventional electronic counter 98 or the like, such as a decade counter, which records the pulses from photoelectric cell 22 as amplified by amplifier circuit 26. As is well known by those skilled in the art, a Schmitt trigger develops a constant amplitude square pulse at the output thereof when the input is excited by an irregular or narrow pulse, such as the pulse applied to transistor 72 when photocell 22 is excited by reflected light. It is well within the competence of those skilled in the art to select biasing resistors and other circuit components having appropriate parameters.

The operation of the present invention is as follows: with the amplifier circuit energized, power is supplied to lamp 36 through conductor 50 and conductive shield 48 of cable 24. The light of the lamp is transmitted through translucent body 28 and emitted from convex lens surface 14 of the body. Thus, the light illuminates the surface of shaft S and is reflected therefrom to enter opening 18 in tubular opaque shield 20, thus to excite photoelectric cell 22. Because opaque shield 20 lies between photocell 22 and translucent body 28, the only light impinging upon the photocell will be that reflected from the object at which the probe is directed and will enter through end 18. As shaft S rotates, non-reflective strip 16 interrupts the reflected light impinging on photocell 24, with a resultant change in the signal between conductors 58 and 50 in cable 24. Such change is sensed by amplifier circuit 26 and after being amplified and shaped by transistor stages 72, 80 and 86, it is transmitted to output terminals 94 and 96. Thus, each time non-reflective strip 16 interrupts the path of light reflection, a substantial electrical signal is developed between output terminals 94 and 96 which signal can be counted by means 98 well known by those skilled in the art.

Because photocell 22 is centrally and concentrically located relative convex lens surface 14 on translucent body 28, spacing between the probe and the shaft is not critical. Therefore, installation of the probe 12 can be made in a wide variety of positions without requiring special adjustments within the probe. By this means, I have provided an extremely versatile and simple event counting system.

While one embodiment of my invention has been shown and described, it will be apparent that other adaptations and modifications can be made without departing from the spirit and scope of the invention.

I claim:

1. Apparatus for sensing the motion of a moving object having thereon surface portions of different light reflectivity comprising: an opaque casing defining a circular opening, lamp means mounted in said casing, a lens mounted in said opening in light communication with said lamp means, said lens having a convex face exterior said casing thereby to form a light field for illuminating said object, said lens face being formed with a central aperture, a tubular opaque shield mounted in said aperture and extending exterior of said convex lens face so as to prevent direct illumination of the interior of said shield by light from said lens surface, said shield being formed with an opening therein at the exterior end for admitting light reflected from said object into said shield, means disposed in said shield for generating an electric signal proportional to the reflected light admitted into said shield, and means for counting the signal variations generated by said generating means.

2. In combination with a rotatable shaft having a light reflective surface and a strip of non-reflective material covering a portion of said surface; apparatus for counting the number of revolutions of said shaft comprising: an opaque centrally bored casing, a translucent body disposed in said casing and defining a convex lens surface axially protruding from said casing, said translucent body being formed with the cylindric opening disposed concentrically with said convex lens surface, an opaque shield mounted in said opening and projecting beyond said lens surface so as to prevent direct illumination of the interior of said shield by light from said lens surface, said shield being opened only at said projecting end, means disposed in said shield in communication with said end opening for generating an electric signal proportional to the light intensity impinging thereon, means within said tubular casing for illuminating said translucent body thereby to illuminate said lens, and means for amplifying the output of said electric signal generating means, whereby the amplified output from said signal generating means varies at a frequency proportional to the speed of rotation of said shaft.

3. Apparatus for sensing variations in light reflectivity of a surface moving relative to the apparatus comprising a generally cylindric hollow casing, a body of translucent material disposed in said casing and forming at one end of said casing a convex lens face, said casing and translucent body being radially bored at a site remote from said convex face, a lamp disposed in said bore for illuminating said lens face whereby a field of illumination is established in front of said lens face, means for removably securing said lamp in said bore, an opaque shield disposed co-axially with said casing and being formed with an opening for admitting light thereinto, said opening being directed without the field of illumination of said lens face and within the field of light reflection from the moving surface, means within said opaque shield for generating an electric signal proportional to the intensity of light entering said shield, means for generating power for said lamp, means for amplifying the signal from said signal generating means, and cable means for connecting said power generating means and said amplifying means to said probe.

References Cited by the Examiner

UNITED STATES PATENTS

| | | | |
|---|---|---|---|
| 2,594,741 | 3/1952 | Dexter | 250—236 X |
| 2,838,683 | 6/1958 | Munro | 250—227 |
| 2,964,640 | 12/1960 | Wippler | 250—218 |
| 3,130,317 | 4/1964 | Connelly et al. | 250—227 |

WALTER STOLWEIN, *Primary Examiner.*